United States Patent
Shin et al.

(10) Patent No.: US 7,588,854 B2
(45) Date of Patent: Sep. 15, 2009

(54) FUEL CELL SYSTEM HAVING NO FUEL PUMP

(75) Inventors: Seung Shik Shin, Yongin (KR); Ho Jin Kweon, Yongin (KR); Tae Keun Kim, Yongin (KR)

(73) Assignee: Samsung SDI Co., Ltd., Suwon-si (KR)

( * ) Notice: Subject to any disclaimer, the term of this patent is extended or adjusted under 35 U.S.C. 154(b) by 321 days.

(21) Appl. No.: 11/584,266

(22) Filed: Oct. 20, 2006

(65) Prior Publication Data

US 2007/0092774 A1    Apr. 26, 2007

(30) Foreign Application Priority Data

Oct. 21, 2005   (KR) .................. 10-2005-0099923

(51) Int. Cl.
*H01M 8/04* (2006.01)
(52) U.S. Cl. ......................................... 429/35
(58) Field of Classification Search .................. 429/25, 429/34, 30
See application file for complete search history.

(56) References Cited

U.S. PATENT DOCUMENTS 5,048,565 A * 9/1991 Oi .......................... 137/614.19
6,686,081 B2 * 2/2004 Gottesfeld .................... 429/30

FOREIGN PATENT DOCUMENTS

| JP | 8-222253 | 8/1996 |
| JP | 3646024 | 5/2005 |
| KR | 2002-0095492 | 12/2002 |

OTHER PUBLICATIONS

Patent Abstracts of Japan, Publication No. 08-222253, Published on Aug. 30, 1996, in the name of Hashizaki, et al.
Patent Abstracts of Japan, Publication No. 2001-093556, Published on Apr. 6, 2001, in the name of Tanaka, et al., corresponding to JP 3646024.
Korean Patent Abstracts, Publication No. 1020020095492 A, Published on Dec. 27, 2002, in the name of Jung, et al.

* cited by examiner

*Primary Examiner*—Patrick Ryan
*Assistant Examiner*—Thomas H. Parsons
(74) *Attorney, Agent, or Firm*—Christie Parker & Hale LLP

(57) ABSTRACT

A fuel cell system having no fuel pump, including: an electric generator to generate electricity by electrochemical reaction between hydrogen-containing fuel and an oxidant; and a fuel feeder including a fuel tank in which the hydrogen-containing fuel to be supplied to the electric generator is stored, wherein the fuel feeder includes a gas pressure applying unit provided between the electric generator and the fuel tank and adapted to recover gas produced in the electrochemical reaction and apply the recovered gas to the fuel tank and drive the fuel into the electric generator. With this configuration, the gas, such as carbon dioxide, produced by the electrochemical reaction between hydrogen and oxygen is supplied to the fuel tank without requiring a fuel pump, so the hydrogen-containing fuel is smoothly supplied and thereby enhances the fuel cell's efficiency in generating power.

18 Claims, 2 Drawing Sheets

FUEL CELL SYSTEM HAVING NO FUEL PUMP

CROSS-REFERENCE TO RELATED APPLICATIONS

This application claims priority to and the benefit of Korean Patent Application No. 10-2005-0099923, filed on Oct. 21, 2005, in the Korean Intellectual Property Office, the entire content of which is incorporated herein by reference.

BACKGROUND

1. Field of the Invention

The present invention relates to a fuel cell system in which hydrogen-containing fuel is supplied without using a fuel pump, and electrochemically reacted with oxygen to generate electricity, and more particularly, to a fuel cell system in which carbon dioxide produced by an electrochemical reaction between hydrogen and oxygen is used in supplying hydrogen-containing fuel.

2. Discussion of Related Art

In general, a fuel cell system generates electricity by electrochemically reacting hydrogen obtained from hydrocarbonaceous fuel such as natural gas, etc., or hydrogen-containing fuel such as methanol, etc., with oxygen in air.

The fuel cell system is a power-generating device to generate electricity by an electrochemical reaction between hydrogen (or hydrogen-containing fuel) and oxygen (or an oxidant). The fuel cell system includes an electric generator to generate electricity. The electric generator includes a unit cell (or cell unit) provided with a membrane electrode assembly that includes an electrolyte membrane having selective ion permeability, and cathode and anode electrodes provided in opposite sides of the electrolyte membrane.

The fuel cell system can be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), etc., according to the kind of electrolyte used. In such fuel cell systems, the PEMFC (or PEMFC system) has good output characteristics, operates in low temperatures, quickly starts and has a short response time. Thus, the PEMFC can be used as a portable power generator. The PEMFC needs a reformer to obtain hydrogen from the hydrogen-containing fuel, which puts a limitation on miniaturizing the fuel cell system. To overcome such a limitation, a direct methanol fuel cell (DMFC) that directly uses methanol as the hydrogen-containing fuel (without a reformer) has been developed. However, the typical PEMFC and the DMFC still need to use a fuel pump, which causes noise and increases power consumption, to supply the methanol or hydrogen-containing fuel.

Korean Patent Publication No. 10-2002-0095492 discloses a DMFC (or DMFC system) in which gas produced in an electric generator is discharged to the outside through a fuel tank. Referring to FIG. 3, the conventional fuel cell system includes a fuel feeder 20 formed with fuel supplying holes 30 through which fuel is supplied to a fuel cell stack 22, and discharging gas inlets 30 through which gas is discharged from the fuel cell stack 22. However, in the conventional fuel cell system, a single opening is used as both the fuel supplying hole and the discharging gas inlet, and thus, the fuel is not smoothly supplied because of the discharged gas, thereby deteriorating the fuel cell system's efficiency in generating electricity.

SUMMARY OF THE INVENTION

An aspect of the present invention provides a fuel cell system having no fuel pump and, instead of a fuel pump, using the carbon dioxide produced by the electrochemical reaction between hydrogen and oxygen to supply hydrogen-containing fuel.

Another aspect of the present invention provides a fuel cell system having no fuel pump in which hydrogen-containing fuel is smoothly supplied to thereby enhance efficiency in generating electricity.

An embodiment of the present invention provides a fuel cell system having no fuel pump. The fuel cell system includes an electric generator adapted to generate electricity by an electrochemical reaction between a hydrogen-containing fuel and an oxidant; and a fuel feeder including a fuel tank for storing the hydrogen-containing fuel, wherein the fuel feeder further includes a gas pressure applying unit provided between the electric generator and the fuel tank and adapted to apply pressure from gas recovered from the electric generator to the fuel tank.

In one embodiment of the invention, the fuel cell system further includes a check valve provided between the gas pressure applying unit and the electric generator, and the gas pressure applying unit includes a safety valve adapted to reduce or prevent an excessive pressure of the gas from being applied to the electric generator.

In one embodiment of the invention, the fuel cell system further includes a gas-liquid separator provided between the fuel tank and the electric generator to externally discharge gas contained in the hydrogen-containing fuel. Further, the gas-liquid separator includes a gas permeable membrane containing synthetic resin selected from the group consisting of polyfluorine, polyalkene, cellulosics, polyvinyls, polysulfones, polyamide, and combinations thereof.

In one embodiment of the invention, the fuel tank has one side connected with the gas pressure applying unit, and another side formed with a discharging hole through which the hydrogen-containing fuel is discharged to the electric generator.

In one embodiment of the invention, the gas includes carbon dioxide.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following description, only certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, and not restrictive.

Figure 1:
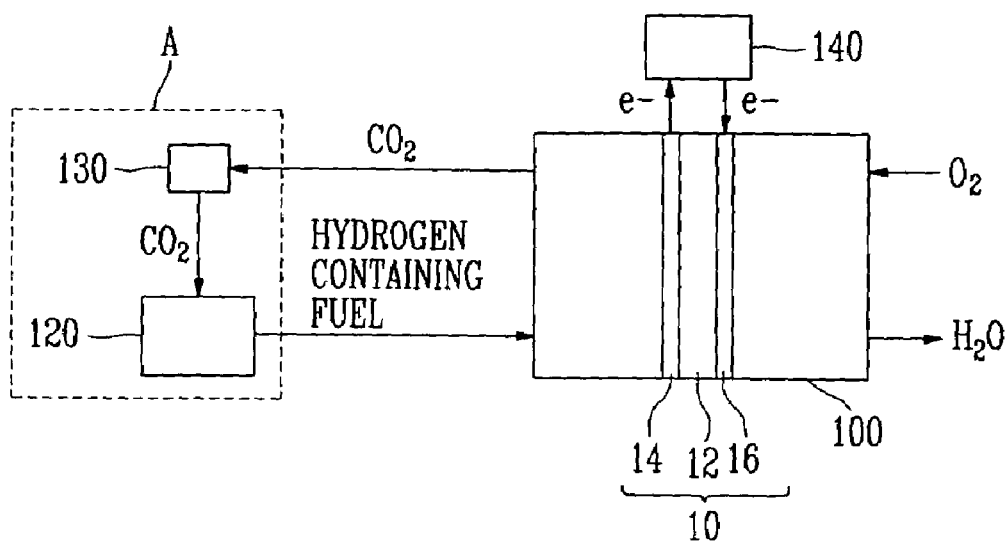
FIG. 1 is a schematic view of a fuel cell system having no fuel pump according to an embodiment of the present invention.

Referring to FIG. 1, a fuel cell system includes an electric generator 100 having a unit cell (or cell unit) to generate electricity by an electrochemical reaction between hydrogen (or hydrogen-containing fuel) and oxygen (or an oxidant), and a fuel feeder A having a fuel tank 120 for storing hydrogen-containing fuel (or fuel containing hydrogen) to be supplied to the electric generator 100. Here, the electric generator 100 is fed with an oxidant (i.e. oxygen or oxygen-containing air from the outside).

The hydrogen-containing fuel includes at least one liquid fuel selected from the group consisting of alcohol fuels, such as methanol, ethanol, etc.; hydrocarbonaceous fuels, such as methane, propane, butane, etc.; and natural gas fuels, such as liquefied natural gas or the like.

FIG. 1 also illustrates a load 140 to which electricity generated in the electric generator 100 is supplied.

The unit cell of the electric generator 100 includes a membrane electrode assembly (MEA) 10 that has a polymer electrolyte membrane 12, an anode electrode 14 provided in (or at) one (or a first) side of the polymer electrolyte membrane 12, and a cathode electrode 16 provided in (or at) the other (or a second) side of the polymer electrolyte membrane 12. Further, the unit cell includes bipolar plates (not shown) provided in and facing the opposite sides of the membrane electrode assembly 10 and supplying the anode electrode 14 with hydrogen-containing fuel and the cathode electrode 16 with the oxidant.

According to an embodiment of the invention, the fuel feeder A includes a gas pressure applying unit 130 that recovers gas generated from the electric generator 100 and supplies a fuel tank 120 with the recovered gas. Here, the gas pressure applying unit 130 is provided between the electric generator 100 and the fuel tank 120 and is connected with them. Therefore, the gas generated in the electric generator 100 (e.g., carbon dioxide) is introduced into the fuel tank 120 via the gas pressure applying unit 130, and thus, the gas pressure applied to the fuel tank 120 serves as a driving force to smoothly supply the hydrogen-containing fuel from the fuel tank 120 to the electric generator 100.

Figure 2:
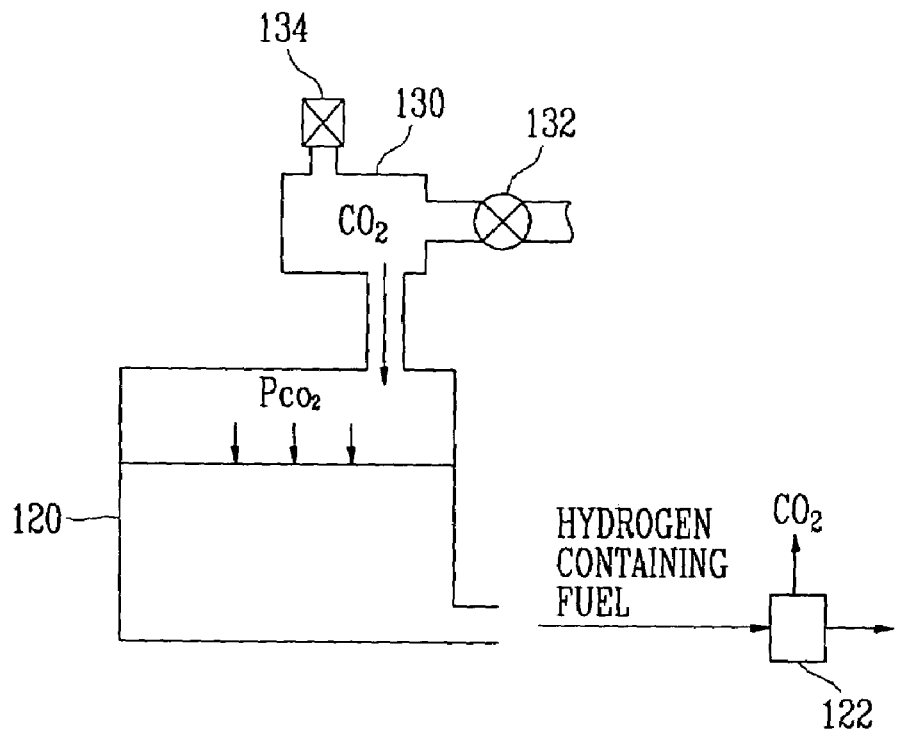
FIG. 2 is a schematic view of a fuel feeder provided in the fuel cell system of FIG. 1.
Figure 3:
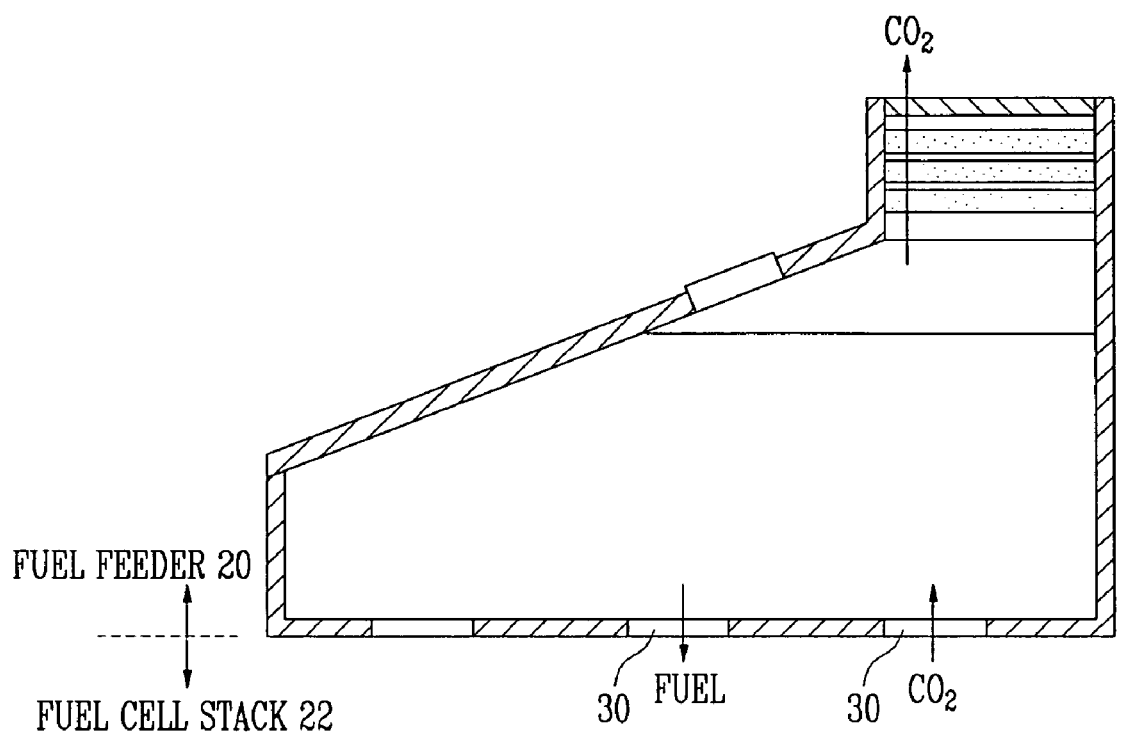
FIG. 3 is a schematic view of a fuel feeder provided in a conventional DMFC.

Referring to FIGS. 1 and 2, in one embodiment of the invention, a check valve 132 can be provided between the electric generator 100 and the gas pressure applying unit 130 to prevent the gas pressure from being applied to (or back to) the electric generator 100; however, the invention is not thereby limited. Here, the check valve 132 reduces or prevents the pressure of the discharging gas (i.e., relatively high), which is recovered from the electric generator 100 into the gas pressure applying unit 130, from being applied to (or back to) the electric generator 100, thereby maintaining the stability of the electric generator 100.

Further, in an embodiment of the invention, the gas pressure applying unit 130 is provided with a safety valve 134 to reduce or prevent the gas pressure from being excessively applied to the fuel tank 120. When the pressure of gas recovered from the electric generator 100 is higher than a certain (or predetermined) pressure (e.g., ranging from about 1 to about 5 bar), the safety valve 134 allows the recovered gas to be externally discharged.

In an embodiment, the fuel tank 120 and the electric generator 100 are connected (or communicate) with each other so as to supply the hydrogen-containing fuel (or fuel containing hydrogen) through a supply-guiding pipe. Here, the supply-guiding pipe is provided with a gas-liquid separator 122 to reduce or prevent the gas from the gas pressure applying unit 130 (e.g., carbon dioxide) from being introduced into the electric generator 100. Further, the supply-guiding pipe may include an adjusting valve (not shown) to adjust the supply of the hydrogen-containing fuel to the electric generator 100.

In the state that the adjusting valve is closed, the hydrogen-containing fuel is not supplied, and the fuel tank 120 is maintained at a certain (or predetermined) gas pressure (e.g., ranging from about 1 to about 5 bar). Then, when the adjusting valve is opened, the hydrogen-containing fuel is supplied from the fuel tank 120 to the electric generator 100 by the driving force of the gas pressure.

Now, a method of operating the fuel cell system according to an embodiment of the present invention will be described in more detail.

When the fuel cell system starts operating, and the adjusting valve is opened, the gas pressure applying unit 130 applies the driving force based on a certain (or predetermined) gas pressure to the fuel tank 120, and the hydrogen-containing fuel is supplied from the fuel feeder A to the electric generator 100. Also, the oxidant is supplied to the electric generator 100.

The hydrogen-containing fuel supplied to the electric generator 100 is introduced into the anode electrode 14 of the unit cell via a fuel channel formed in the bipolar plate. In the anode electrode 14, the hydrogen-containing fuel is oxidized by activation of a catalyst, so that a hydrogen ion ($H^+$) and an electron ($e^-$) are generated and also a gas, such as carbon dioxide ($CO_2$), is generated as a byproduct. In the case where the hydrogen-containing fuel is a liquid fuel (e.g., methanol), the hydrogen ion ($H^+$) and the electron ($e^-$) are generated by oxidation as shown by the following formula 1.

$$CH_3OH + H_2O \rightarrow CO_2 + 6H^+ + 6e^- \qquad (1)$$

At this time, in the unit cell, the hydrogen ion ($H^+$) is transferred to the cathode electrode 16 through the polymer electrolyte membrane 12. Further, the generated gas, such as carbon dioxide ($CO_2$), is recovered into the gas pressure applying unit 130 and supplied to the fuel tank 120. As a result, the gas pressure ($P_{CO2}$) applied to the fuel tank 120 remains constant, so the hydrogen-containing fuel is smoothly supplied from the fuel tank 120 to the electric generator 100.

As shown in formula 1, 1 mol of liquid methanol reacts to produce 1 mol of gaseous carbon dioxide. Because the density of methanol is about 0.798 g/mol, the volume of 1 mol is of 40.64 ml. Under the same conditions, gaseous carbon dioxide produced by the reaction of methanol has a volume of 22.4 L. That is, carbon dioxide produced by the above reaction of 1 mol of liquid methanol has a volume about 550 times larger than that of liquid methanol. When such a high volume of carbon dioxide is recovered into the gas pressure applying unit 130, the gas pressure applying unit 130 applies high gas pressure to the fuel tank 120. In this case, the safety valve 134 is opened, allowing carbon dioxide to be discharged, thereby reducing or preventing too high of a gas pressure from being applied to the fuel tank 120.

As the safety valve 134 is opened and closed, constant gas pressure is applied to the fuel tank 120, and thus the hydrogen-containing fuel is smoothly supplied from the fuel tank 120 to the electric generator 100. In the meantime, the gas-liquid separator 122 is provided in an entrance of the electric generator 100, thereby reducing or preventing carbon dioxide from being introduced into the electric generator 100 along with the hydrogen-containing fuel. Here, the gas-liquid separator 122 has a gas permeable membrane (not shown) that is made of synthetic resin formed with micropores through which liquid hydrogen-containing fuel (e.g., methanol) cannot pass but through which gaseous carbon dioxide can pass. The gas permeable membrane can be provided to limit a flowing path of the hydrogen-containing fuel; however, the invention is not thereby limited. Further, the synthetic resin includes polyfluorine resin, polyalkene resin, cellulosic resin, polyvinyl resin, polysulfone resin and/or polyamide resin. In one embodiment, Teflon® is used as the polyfluorine resin; however, the invention is not thereby limited.

Therefore, while passing through the gas-liquid separator 122, the hydrogen-containing fuel does not pass through the gas permeable membrane and is supplied to the electric generator 100. Here, carbon dioxide is discharged to the outside through the gas permeable membrane. As a result, the hydrogen-containing fuel (or substantially only the hydrogen-containing fuel) is supplied to the electric generator 100.

Further, the check valve 132 reduces or prevents the relatively high gas pressure of the discharging gas from being applied to (or back to) the electric generator 100, thereby enhancing the stability of the electric generator 100.

The oxidant (e.g., oxygen) supplied to the electric generator is introduced into the cathode electrode 16 of the unit cell through an oxidant channel formed in the bipolar plate. In the cathode electrode 16, the hydrogen ion ($H^+$) transferred from the anode electrode 14 through the polymer electrolyte membrane 12 is reduced by the activation of the catalyst, and thus water is produced as shown in the following formula 2.

$$(3/2)O_2 + 6H^+ + 6e^- \rightarrow 3H_2O \quad (2)$$

Then, the byproduct produced in the unit cell, such as water, is discharged from the electric generator 100 to the area external to the electric generator.

Further, the electrons generated in the electric generator 100 are supplied to the load 140 through an output terminal (not shown).

In view of the foregoing, according to an embodiment of the present invention, carbon dioxide produced by the electrochemical reaction between hydrogen and oxygen is supplied to the fuel tank (e.g., fuel tank 120) without requiring a fuel pump so that the hydrogen-containing fuel is smoothly supplied to the electric generator (e.g., the electric generator 100) to thereby enhance the efficiency in generating power.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A fuel cell system having no fuel pump, the fuel cell system comprising:
   an electric generator adapted to generate electricity by an electrochemical reaction between a hydrogen-containing fuel and an oxidant;
   a fuel feeder including a fuel tank for storing the hydrogen-containing fuel; and
   a gas-liquid separator provided between the fuel tank and a fuel entrance of the electric generator for externally discharging gas contained in the hydrogen-containing fuel,
   wherein the fuel feeder comprises a gas pressure applying unit provided between the electric generator and the fuel tank and adapted to apply pressure of gas recovered from the electric generator to the fuel tank.

2. The fuel cell system according to claim 1, further comprising a check valve provided between the gas pressure applying unit and the electric generator.

3. The fuel cell system according to claim 1, wherein the gas pressure applying unit comprises a safety valve adapted to reduce or prevent an excessive pressure of the gas from being applied to the electric generator.

4. The fuel cell system according to claim 1, wherein the gas-liquid separator comprises a gas permeable membrane.

5. The fuel cell system according to claim 4, wherein the gas permeable membrane comprises a synthetic resin selected from the group consisting of polyfluorine, polyalkene, cellulosics, polyvinyls, polysulfones, polyamide, and combinations thereof.

6. The fuel cell system according to claim 1, wherein the fuel tank has one side connected with the gas pressure applying unit, and another side formed with a discharging hole through which the hydrogen-containing fuel is discharged to the electric generator.

7. The fuel cell system according to claim 1, wherein the gas comprises carbon dioxide.

8. The fuel cell system of claim 1, wherein the fuel cell system is a direct methanol fuel cell (DMFC) system.

9. The fuel cell system of claim 1, wherein the electric generator comprises a membrane electrode assembly.

10. The fuel cell system of claim 9, wherein the membrane electrode assembly comprises:
    a polymer electrolyte membrane;
    an anode electrode at a first side of the polymer electrolyte membrane; and
    a cathode electrode at a second side of the polymer electrolyte membrane.

11. The fuel cell system of claim 1, wherein the electric generator comprises:
    a polymer electrolyte membrane;
    an anode electrode at a first side of the polymer electrolyte membrane; and
    a cathode electrode at a second side of the polymer electrolyte membrane.

12. A fuel cell system having no fuel pump, the fuel cell system comprising:
    an electric generator adapted to generate electricity by an electrochemical reaction between a hydrogen-containing fuel and an oxidant;
    a fuel tank for storing the hydrogen-containing fuel;
    a gas-liquid separator provided between the fuel tank and a fuel entrance of the electric generator for externally discharging gas contained in the hydrogen-containing fuel; and
    means for transferring the hydrogen-containing fuel from the fuel tank to the electric generator by applying pressure of gas recovered from the electric generator to the fuel tank, the means for transferring the hydrogen-containing fuel being provided between the electric generator and the fuel tank.

13. The fuel cell system of claim 12, wherein the gas comprises carbon dioxide.

14. The fuel cell system according to claim 12, wherein the gas-liquid separator comprises a gas permeable membrane.

15. The fuel cell system according to claim 14, wherein the gas permeable membrane comprises a synthetic resin selected from the group consisting of polyfluorine, polyalkene, cellulosics, polyvinyls, polysulfones, polyamide, and combinations thereof.

16. The fuel cell system according to claim 12, further comprising a check valve provided between the means for transferring the hydrogen-containing fuel and the electric generator.

17. The fuel cell system according to claim 12, wherein the means for transferring the hydrogen-containing fuel comprises a safety valve adapted to reduce or prevent an excessive pressure of the gas from being applied to the electric generator.

18. The fuel cell system according to claim 12, wherein the fuel tank has one side connected with the means for transferring the hydrogen-containing fuel, and another side formed with a discharging hole through which the hydrogen-containing fuel is discharged to the electric generator.

* * * * *